US007706921B2

(12) United States Patent
Jung

(10) Patent No.: US 7,706,921 B2
(45) Date of Patent: Apr. 27, 2010

(54) MOVING DISTANCE SENSING APPARATUS FOR ROBOT CLEANER AND METHOD THEREFOR

(75) Inventor: Il-Kyun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 695 days.

(21) Appl. No.: 11/086,746

(22) Filed: Mar. 23, 2005

(65) Prior Publication Data

US 2006/0100741 A1    May 11, 2006

(30) Foreign Application Priority Data

Nov. 11, 2004   (KR) ...................... 10-2004-0092083

(51) Int. Cl.
*G05B 15/00* (2006.01)
*G05B 19/00* (2006.01)
*G01C 25/00* (2006.01)

(52) U.S. Cl. ......................................... 700/258; 702/97
(58) Field of Classification Search ................. 700/247, 700/254, 258, 41, 43, 68; 702/104, 149, 702/158, 159, 97
See application file for complete search history.

(56) References Cited

U.S. PATENT DOCUMENTS 6,333,631 B1 * 12/2001 Das et al. ..................... 324/326
2004/0244138 A1 * 12/2004 Taylor et al. .................. 15/319

FOREIGN PATENT DOCUMENTS

| CN | 1436511 A   | 8/2003 |
| GB | 2 353 095 A | 2/2001 |
| JP | 9-206258 A  | 8/1997 |
| JP | 9206258     | * 8/1997 ................. 700/245 |

OTHER PUBLICATIONS

Flynn, A. M., "Combining Sonar and Infrared Sensors for Mobile Robot Navigation," *The International Journal of Robotics Research*, vol. 7, No. 6, Dec. 1, 1998, pp. 5-14.
Van Henten et al., "Cropscout—a Mini Field Robot for Research on Precision Agriculture," *Proceedings of the 2nd Field Robot Event 2004*, Jun. 17-18, 2004, pp. 47-60.
Benet et al., "Using Infrared Sensors for Distance Measurement in Mobile Robots," *Robotics and Autonomous Systems*, vol. 40, No. 4, Sep. 30, 2002, pp. 255-266.
Costa et al., "Developing an Experimental Mobile Robot—ROVEL," *IEEE Conference on Industrial Technology 2000*, vol. 1, Jan. 19-22, 2002, pp. 448-453.

* cited by examiner

*Primary Examiner*—Khoi Tran
*Assistant Examiner*—Nicholas Kiswanto
(74) *Attorney, Agent, or Firm*—Birch, Stewart, Kolasch & Birch, LLP

(57) ABSTRACT

Disclosed are a moving distance sensing apparatus for a robot cleaner and a method therefor capable of determining a precise moving distance with respect to the robot cleaner by setting a long distance sensor and a short distance sensor having respectively different sensing method from each other on the same sensing line in the robot cleaner to sense the long distance and the short distance for the same direction, and then by determining coherency to each moving distance on the basis of information provided by the two different sensors, the moving distance sensing apparatus comprising: a long distance sensor for sensing a moving distance with respect to a long distance; a short distance sensor mounted on the same sensing line in one-to-one correspondence with the long distance sensor, for sensing a moving distance with respect to a short distance; and a micro computer for determining a moving distance error on the basis of moving distance information with respect to the same direction provided by the long distance sensor and the short distance sensor.

19 Claims, 3 Drawing Sheets

MOVING DISTANCE SENSING APPARATUS FOR ROBOT CLEANER AND METHOD THEREFOR

BACKGROUND OF THE INVENTION

1. Field of the Invention

The present invention relates to a robot cleaner, and particularly, to a moving distance sensing apparatus for a robot cleaner and a method therefor capable of sensing precisely a moving distance of the robot cleaner by mounting a short distance sensor and a long distance sensor on the same sensing line.

2. Description of the Related Art

In general, a robot cleaner is a machine for automatically cleaning where to clean by sucking foreign materials such as dust from a floor while travelling around there by itself without a handling by a user.

FIG. 1 is a block diagram showing a configuration with respect to a travelling system of a conventional robot cleaner.

As can be seen from FIG. 1, a travelling system of the conventional robot cleaner is comprised of: an obstacle sensing unit 1 for sensing an obstacle during a movement of the robot cleaner; a motor controlling unit 2 for outputting a motor control command signal to keep away from the obstacle depending on an obstacle sensing signal outputted from the obstacle sensing unit 1; a left-side-wheel motor driving unit 3 for driving a left-side-wheel motor 5 in response to a motor control command signal inputted from the motor controlling unit 2; and a right-side-wheel motor driving unit 4 for driving a right-side wheel motor 6 in response to the motor control command signal inputted from the motor controlling unit 2.

FIG. 2 is a flow chart showing an operation with respect to a moving method for the conventional robot cleaner.

Referring to FIG. 2, once a user instructs a robot cleaner to clean, the robot cleaner carries out a cleaning operation and recognizes whether there is an obstacle to be sensed (steps ST1~ST3). At this time, if an obstacle is sensed, the robot cleaner performs an operation to keep away from the obstacle by driving the left-side or right-side wheel motor (step ST4). After avoiding the obstacle, the robot cleaner keeps going straight and then performs the cleaning operation again until it is completed (steps ST5 and ST6). Finally, when the cleaning has been done, the robot cleaner stops its movement (step ST6).

As aforementioned, the robot cleaner performs a cleaning operation with travelling a predetermined path or an arbitrary path or avoiding obstacle by means of a program installed therein. However, in order to carry out the cleaning operation, various information such as a location determination, measurement of a travelling range, sensing obstacle, or the like, should be provided for the robot cleaner, for which many sensors are required. In particular, the robot cleaner should have a sensing system which can sense a long distance and a short distance at the same time and also sense a mis-operation. However, a sensor like a laser sensor capable of precisely sensing the long and short distances requires a high price so that it is difficult to apply it to the robot cleaner. Additionally, in case of using a low price of sensor such as a ultrasonic sensor, once sensing a long distance to a specific object while the robot cleaner moves, thereafter, when measuring a short distance with respect to the same object, error can be disadvantageously occurred during measuring the distance due to a slip or a sensor error, thereby frequently occurring a mis-operation of the robot cleaner.

SUMMARY OF THE INVENTION

Therefore, an object of the present invention is to provide a moving distance sensing apparatus and a method therefor capable of measuring a more precise moving distance by simultaneously sensing long and short distances with respect to the same direction thereof by mounting a long distance sensor and a short distance sensor which have different sensing methods from each other on the same sensing line, and then determining coherency on the basis of information provided by the two different types of sensors.

To achieve these and other advantages and in accordance with the purpose of the present invention, as embodied and broadly described herein, there is provided a moving distance sensing apparatus for a robot cleaner comprising: a long distance sensor for sensing a moving distance with respect to a long distance; a short distance sensor mounted on the same sensing line in one-to-one correspondence with the long distance sensor, for sensing a moving distance with respect to a short distance; and a micro-computer for determining a moving distance error on the basis of moving distance information with respect to the same direction provided by the long distance sensor and the short distance sensor.

To achieve these and other advantages and in accordance with the purpose of the present invention, as embodied and broadly described herein, there is provided a method for sensing a moving distance of a robot cleaner comprising the steps of: sensing a moving distance with respect to a long distance by the long distance sensor and a moving distance with respect to a short distance by the short distance sensor during its movement; calculating each decreasing rate or each increasing rate for the moving distances sensed by the respective sensors; and in case that the decreasing rates or the increasing rates for the calculated moving distances are coherent to each other, recognizing them as precise values, while in case that they are not coherent to each other, determining that there has occurred an error.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

With reference to the accompanying drawings, it will be described in detail about a preferred embodiment for a moving distance sensing apparatus and a method for sensing the moving distance capable of measuring a more precise moving distance by simultaneously sensing long and short distances with respect to the same direction thereof by mounting a long distance sensor and a short distance sensor which have different sensing methods from each other on the same sensing line, and determining coherency on the basis of the sensed information provided by the two different types of sensors.

Figure 1:
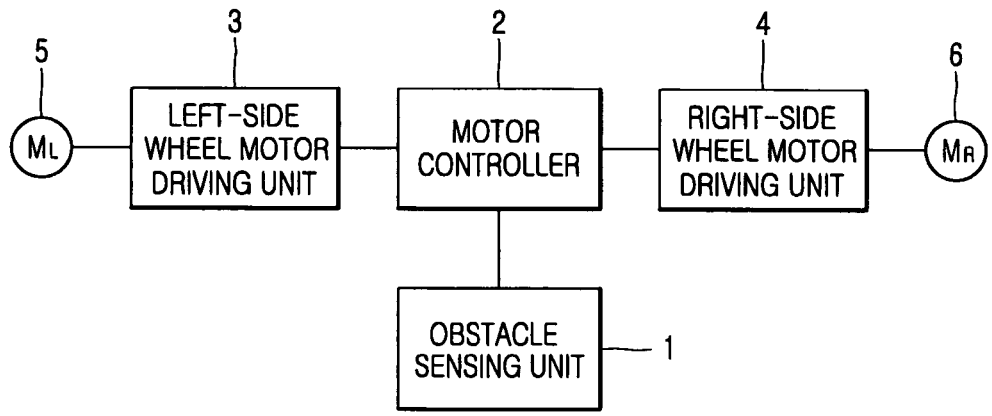
FIG. 1 is a block diagram showing a configuration for a travelling system of a conventional robot cleaner.
Figure 2:
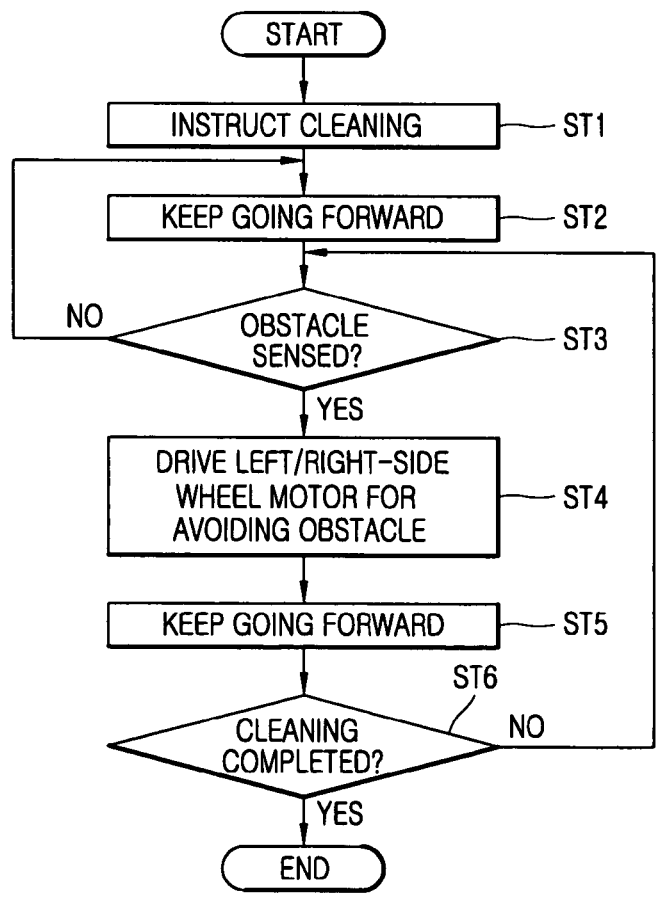
FIG. 2 is a flow chart showing an operation with respect to a moving method for the conventional robot cleaner.
Figure 3:
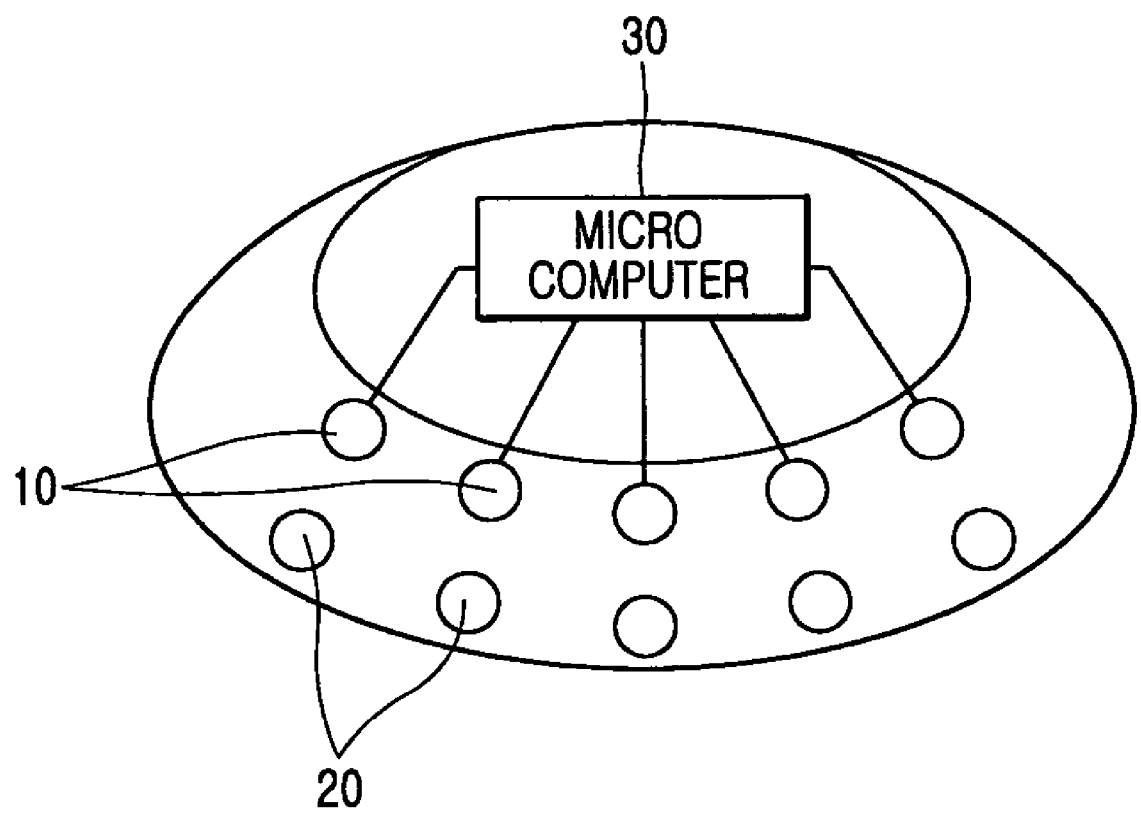
FIG. 3 is an explanatory diagram showing a configuration for a distance sensing apparatus of a robot cleaner in accordance with the present invention.

FIG. 3 is an explanatory diagram showing a configuration for a distance sensing apparatus of a robot cleaner in accordance with the present invention.

Referring to FIG. 3, the distance sensing apparatus of the robot cleaner in accordance with the present invention includes: a long distance sensor 10 mounted on an outer circumferential surface of the robot cleaner at a uniform interval, and mounted on the same sensing line in one-to-one correspondence with a short distance sensor, for sensing a moving distance with respect to the long distance; a short distance sensor 20 mounted on the same sensing line in one-to-one correspondence with the long distance sensor 10; and a micro-computer 30 for determining a moving distance error on the basis of information on the moving distance with respect to the same direction provided by the long distance sensor 10 and the short distance sensor 20.

Here, as the robot cleaner gets close to or away from a predetermined cleaning path or an arbitrary path, the micro-computer 30 compares a moving distance rate sensed by the long distance sensor 10 and a moving distance rate sensed by the short distance sensor 20 placed on the same sensing line to the long distance sensor 10, and determines a moving distance error depending on the compared result. That is, while the robot cleaner moves, when the moving distance sensed by the long distance sensor 10 is relative to the moving distance sensed by the short distance sensor 20 with respect to the same direction and the moving distances therefor are coherently decreased or increased, the micro-computer 30 determines each moving distance as a precise distance sensed value. when the moving distances therefor, on the other hand, are not coherent to each other, the micro-computer 30 decides that there has occurred error. At this time, if it is determined there has occurred error, the micro-computer 30 instructs a driving motor (not shown) to stop the movement of the robot cleaner or reduce speed of the robot cleaner.

On the other side, the micro computer 30 directly compares a moving distance value sensed by the long distance sensor 10 with a moving distance value sensed by the short distance sensor 20, with respect to an area where the sensing area of the long distance sensor 10 overlaps with the sensing area of the short distance sensor 20, and determines the moving distance based on the compared result, thereby making it possible to measure a more precise moving distance value.

Furthermore, in the preferred embodiment of the present invention, the long distance sensor 10 uses a ultrasonic sensor while the short distance sensor 20 uses an infrared sensor. However, they may not be limited in the ultrasonic sensor and the infrared sensor, but can use any sensor which can simultaneously sense the long distance and the short distance with respect to the same direction by disposing the long or short distance sensors having different sensing method from each other on the same sensing line.

It will now be explained how the distance sensor of the robot cleaner according to the present invention is operated.

First, while the robot cleaner moves, a moving distance for a long distance is sensed by the long distance sensor 10 and a moving distance for a short distance is sensed by the short distance sensor 20. Afterwards, the micro-computer 30 calculates each decreasing rate or each increasing rate with respect to the moving distances sensed by the respective sensors. Then, the micro-computer 30 compares the decreasing rates or the increasing rates with respect to the respectively calculated moving distances with each other. If it is determined to be coherent to each other, the micro-computer 30 recognizes each moving distance as a correct value. If, on the other hand, it is determined to be different from each other, the micro-computer 30 recognizes that there has occurred error. At this time, if it is determined that there has occurred error, the micro-computer 30 instructs the driving motor to stop the robot cleaner or reduce its speed.

Figure 4:
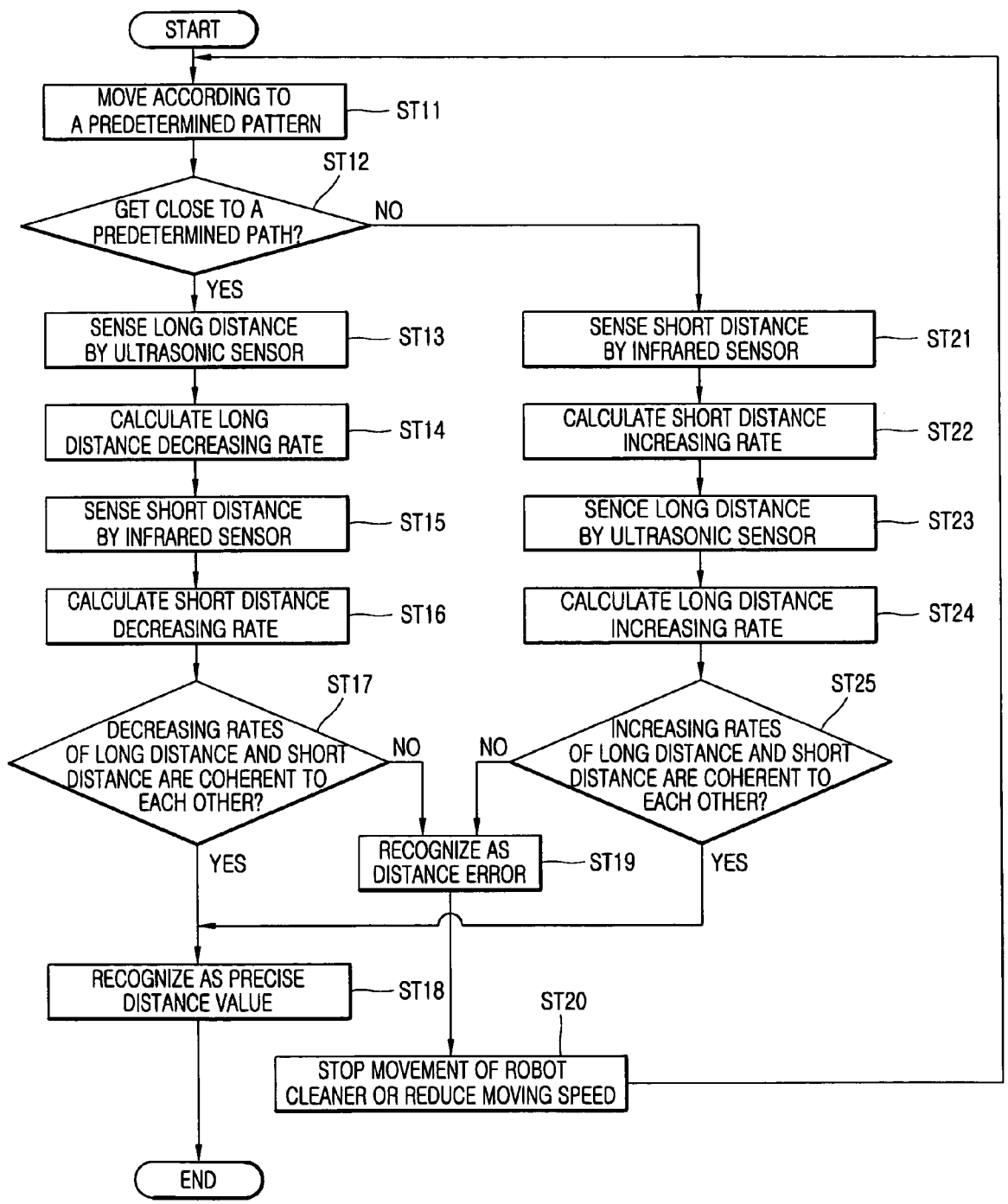
FIG. 4 is a flow chart showing an operation with respect to a method for sensing a moving distance of a robot cleaner in accordance with the present invention.

FIG. 4 is a flow chart showing an operation with respect to a method for sensing a moving distance of the robot cleaner in accordance with the present invention.

Referring to FIG. 4, according to the method for sensing the distance of the robot cleaner according to the present invention, it is determined whether the robot cleaner gets close to or away from a predetermined cleaning path or an arbitrary path (steps ST11 and ST12). Here, a long distance sensor 10 and a short distance sensor 20 having respectively different sensing methods from each other are preset on the same sensing line in a body of the robot cleaner.

Afterwards, when the robot cleaner is approaching to the predetermined path, the long distance sensor 10 senses the long distance thereafter to calculate a long distance decreasing rate according to the movement of the robot cleaner (steps ST13 and ST14). Also, the short distance sensor 20 senses the short distance thereafter to calculate a short distance decreasing rate according to the movement of the robot cleaner (steps ST15 and ST16).

Thereafter, it is carried out to compare the decreasing rate of the long distance sensed by the long distance sensor 10 with the decreasing rate of the short distance sensed by the short distance sensor 20 and determine whether to be coherent to each other (step ST17). On the basis of the determined result, if the decreasing rate of the long distance sensed by the long distance sensor 10 is coherent to the decreasing rate of the short distance sensed by the short distance sensor 20, it is recognized as a precise distance sensed value (step ST18). If not, it is recognized that there has occurred error related to the moving distance values sensed by the long distance sensor 10 and the short distance sensor 20 (step ST19). Therefore, in case of error occurrence, the robot cleaner is stopped or its moving speed is reduced (step ST20).

On the other hand, if it is determined that the robot cleaner gets away from the predetermined cleaning path or the arbitrary path (steps ST11 and ST12), the short distance sensor 20 senses the short distance thereafter to calculate an increasing rate of the short distance according to the movement of the robot cleaner (steps ST21 and ST22). Also, the long distance sensor 10 senses the long distance thereafter to calculate an increasing rate of the long distance according to the movement of the robot cleaner (steps ST23 and ST24).

Thereafter, the increasing rate of the short distance sensed by the short distance sensor 20 is compared with the increasing rate of the long distance sensed by the long distance sensor 10 and it is determined whether to be coherent to each other (step ST25). If the increasing rate of the long distance sensed by the long distance sensor 10 is coherent to the increasing rate of the short distance sensed by the short distance sensor 20, it is determined as a precise moving distance value (step ST18). If not, it is determined that there has occurred error related to the moving distance value sensed by the long distance sensor 10 and the short distance sensor 20

(step ST19). Therefore, in case of error occurrence, the robot cleaner is stopped or its moving speed is reduced (step ST20).

On the other side, with respect to an area where the sensing area of the long distance sensor 10 overlaps with the sensing area of the short distance sensor 20, the micro-computer 30 directly compares the moving distance value sensed by the long distance sensor 10 with the moving distance value sensed by the short distance sensor 20, and determines the moving distance error on the basis of the compared result, thereby being capable of determining a more precise value.

As stated so far, by mounting the long distance sensor 10 and the short distance sensor 20 having respectively different sensing methods on the same sensing line, long and short distances with respect to the same direction are sensed at the same time, and the moving distance error based on the two different sensed information is determined. As a result of this, a more precise moving distance can be measured. Therefore, the sensing error occurred during sensing a moving distance can be sensed correctly without using a high price of sensor, and also it is effective to cope with the error.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A moving distance sensing apparatus for a robot cleaner, comprising:
    a plurality of long distance sensors, each configured to sense a distance with its own sensing area, wherein a sum of respective sensing areas of the long distance sensors corresponds to an entire sensing area of the robot cleaner;
    a plurality of short distance sensors, mounted on the same sensing lines in one-to-one correspondence with the plurality of long distance sensors for the same directions, respectively, each configured to sense a distance with its own sensing area, wherein a sum of respective sensing areas of the short distance sensors corresponds to an entire sensing area of the robot cleaner; and
    a microcomputer configured to determine a precise moving distance and a moving distance error based on distance information with respect to the sensing areas of the long distance sensors and the short distance sensors,
    wherein as the robot cleaner gets close to or away from a predetermined cleaning path or an arbitrary path, the microcomputer compares a moving distance rate sensed by the long distance sensors with a moving distance rate sensed by the short distance sensors, and determines a moving distance error depending on the compared result.

2. The sensing apparatus of claim 1, wherein the plurality of long distance sensors are ultrasonic sensors.

3. The sensing apparatus of claim 1, wherein the plurality of short distance sensors are infrared sensors.

4. The sensing apparatus of claim 1, wherein the long distance sensors are mounted on an outer circumferential surface of the robot cleaner at a uniform interval.

5. The sensing apparatus of claim 1, wherein the micro-computer compares the moving distance value sensed by the long distance sensors with the moving distance value sensed by the short distance sensors with respect to an area where the sensing area of the long distance sensors overlaps with the sensing area of the short distance sensors, and determines a moving distance error based on the compared result.

6. A moving distance sensing apparatus of a robot cleaner comprising:
    a plurality of ultrasonic sensors mounted on an outer circumferential surface of the robot cleaner at a uniform interval and each configured to sense a distance with its own sensing area, wherein a sum of the respective sensing areas of the ultrasonic sensors corresponds to an entire sensing area of the robot cleaner;
    a plurality of infrared sensors mounted on the same sensing lines in one-to-one correspondence with the plurality of ultrasonic sensors for the same direction, respectively, and each configured to sense a distance with its own sensing area, wherein the sum of the respective sensing areas of the infrared sensors corresponds to an entire sensing area of the robot cleaner; and
    a microcomputer configured to determine a precise moving distance and a moving distance error based on distance information with respect to the sensing areas of the ultrasonic sensors and the infrared sensors,
    wherein if the moving distance of a long distance sensed by the ultrasonic sensors and the moving distance of a short distance sensed by the infrared sensors are coherently increased or decreased relatively to each other during a movement of the robot cleaner, it is determined as a precise distance sensed value by the micro-computer, and if not, the microcomputer determines that an error has occurred.

7. The sensing apparatus of claim 6, wherein the microcomputer directly compares the moving distance value sensed by the ultrasonic sensors with the moving distance value sensed by the infrared sensors with respect to an area where the moving distance sensed by the ultrasonic sensors overlaps with the moving distance sensed by the infrared sensors, and determines the moving distance error on the basis of the compared result.

8. The sensing apparatus of claim 6, wherein the microcomputer carries out a command to stop a movement of the robot cleaner or reduce its moving speed in case of error occurrence.

9. The sensing apparatus of claim 6, wherein when a decreasing rate with respect to the moving distance sensed by the ultrasonic sensors is coherent to a decreasing rate with respect to the moving distance sensed by the infrared sensors as the robot cleaner gets close to a specific object while moving along a predetermined cleaning path, the microcomputer determines the moving distance value of the robot cleaner as a precise value.

10. The sensing apparatus of claim 6, wherein when an increasing rate with respect to the moving distance sensed by the ultrasonic sensors is coherent to an increasing rate with respect to the moving distance sensed by the infrared sensors as the robot cleaner gets close to a specific object while moving along a predetermined cleaning path, the microcomputer determines the moving distance value of the robot cleaner as a precise value.

11. A method for sensing a moving distance of a robot cleaner, the method comprising:
    sensing a moving distance based on distance information with respect to sensing areas of a plurality of long distance sensors and short distance sensors while the robot cleaner moves, wherein the plurality of short distance sensors are mounted on the same sensing lines in one-to-one correspondence with the plurality of long distance sensors for the same directions, respectively, wherein each sensor is configured to sense a moving distance with its own sensing area and wherein the sum of the respective sensing areas corresponds to an entire sensing area of the robot cleaner;

calculating a decreasing rate or an increasing rate for the moving distance sensed by respective long and short distance sensors; and in case that the decreasing rates or the increasing rates for the respectively calculated moving distance are coherent to each other, recognizing the moving distances as precise values, while in case that they are not coherent to each other, determining that there has occurred an error.

12. The method of claim 11, wherein the plurality of long distance sensors are ultrasonic sensors and the plurality of short distance sensors are infrared sensors.

13. The method of claim 11, further comprising stopping a movement of the robot cleaner or reducing speed thereof, in case of an error occurring due to inequality of the decreasing rate or the increasing rate thereof.

14. The method of claim 11, further comprising directly comparing the moving distance value sensed by the long distance sensors with the moving distance value sensed by the short distance sensors with respect to the area where an area sensed by the long distance sensors overlaps with an area sensed by the short distance sensors, and then determining the moving distance error on the basis of the compared result.

15. A method for sensing a moving distance, the method comprising:

setting a plurality of long distance sensors and short distance sensors in a body of the robot cleaner, wherein the plurality of short distance sensors are mounted on the same sensing lines in one-to-one correspondence with the plurality of long distance sensors for the same directions, respectively, wherein the long distance sensors and the short distance sensors have different sensing methods and each sensor is configured to sense a distance with its own sensing area, wherein the sum of the respective sensing areas corresponds to an entire sensing area of the robot cleaner;

sensing moving distances using the long distance sensors and the short distance sensors simultaneously, and then calculating decreasing rates or increasing rates with respect to the sensed distances; and comparing the decreasing rates or the increasing rates to determine whether to be coherent to each other, and then determining error for the moving distances.

16. The method of claim 15, wherein the step of calculating the decreasing rates or the increasing rates includes:

determining whether the robot cleaner gets close to or away from a predetermined cleaning path or an arbitrary path; and when the robot cleaner gets close to the predetermined path, sensing a long distance by the long distance sensor to calculate the long distance decreasing rate according to a movement of the robot cleaner, and sensing a short distance by the short distance sensor to calculate the short distance decreasing rate according to the movement of the robot cleaner.

17. The method of claim 15, wherein the step of calculating the decreasing rates or the increasing rates includes:

determining whether the robot cleaner gets close to or away from a predetermined cleaning path or an arbitrary path; and when the robot cleaner gets away from the predetermined path, sensing a short distance by the short distance sensors to calculate the short distance increasing rate according to a movement of the robot cleaner, and sensing a long distance by the long distance sensors to calculate the long distance increasing rate according to the movement of the robot cleaner.

18. The method of claim 15, wherein the step of determining the error further includes the step of stopping the movement of the robot cleaner or reducing speed thereof when the error is occurred.

19. The sensing apparatus of claim 1, wherein the plurality of long distance sensors are vertically spaced from the plurality of short distance sensors.

* * * * *